(12) United States Patent
Poikelkä et al.

(10) Patent No.: US 7,889,726 B2
(45) Date of Patent: Feb. 15, 2011

(54) COMMUNICATION SYSTEM

(75) Inventors: Miikka Poikelkä, Espoo (FI); Tapio Paavonen, Pirkkala (FI)

(73) Assignee: Nokia Corporation, Espoo (FI)

( * ) Notice: Subject to any disclaimer, the term of this patent is extended or adjusted under 35 U.S.C. 154(b) by 1211 days.

(21) Appl. No.: 11/028,605

(22) Filed: Jan. 5, 2005

(65) Prior Publication Data
US 2005/0276268 A1  Dec. 15, 2005

(30) Foreign Application Priority Data
Jun. 11, 2004  (GB) ................................. 0413106.6

(51) Int. Cl.
H04L 12/28  (2006.01)
(52) U.S. Cl. .................... 370/389; 370/395.2
(58) Field of Classification Search ............... 370/395.2
See application file for complete search history.

(56) References Cited

U.S. PATENT DOCUMENTS

2003/0182443 A1* 9/2003 Wang et al. .................. 709/238
2005/0100008 A1* 5/2005 Miyata et al. ............... 370/389

FOREIGN PATENT DOCUMENTS

| JP | 2002-058005 | | 2/2002 |
| JP | 2003-009231 | A | 1/2003 |
| JP | 2003-198582 | A | 7/2003 |
| JP | 2003-526276 | | 9/2003 |
| JP | 2004/002071 | | 12/2003 |

OTHER PUBLICATIONS

Anonymous, "Push-to-Talk Over Cellular (PoC) User Plane; Transport Protocols; PoC Release 1.0"; Transport Protocols v1.1.1, XP-002321969, Oct. 2003, pp. 1-37.
Anonymous, "Push-to-Talk Over Cellular (PoC)—Architecture", XP-002340306, Open Mobile Alliance, May 28, 2004, pp. 1-122.
Ericsson; "IMS based Anonymity in Presence", XP-002340307, 3GPP TSG SA WG3 Security, S3-020622, Nov. 19-22, 2002, pp. 1-9.
Japanese Office Action in connection with counterpart application JP 2007-526584, Notice of Reasons for Rejection, Mar. 31, 2009 (English translation provided).
Notification of the second Office Action dated Oct. 30, 2009, issued by the Patent Office of the People's Republic of China, issued in connection with counterpart Chinese application No. 200580024340.7.
8.8 Privacy, Push to talk over Cellular (PoC)—Architecture, Open Mobile Alliance [Online], May 28, 2004, Draft Version 1.0—May 28, 2004, P32, URL: http://member.openmobilealliance.org/ftp/public_documents/POC/Permanetn_ddocuments/OMA-AD-PoC-V1_0-20040528-D.zip.

* cited by examiner

*Primary Examiner*—Daniel J Ryman
*Assistant Examiner*—John Blanton
(74) *Attorney, Agent, or Firm*—Mintz Levin Cohn Ferris Glovsky and Popeo, P.C.

(57) ABSTRACT

A communication system including a first and second user equipment in communication over a shared floor and a server means for managing the shared floor. According to the system, the server means is arranged to detect an anonymity request from the first user equipment and, responsive to the anonymity request, to prevent the second user equipment from identifying the first user equipment from user plane messages transmitted from the first user equipment to the second user equipment.

27 Claims, 6 Drawing Sheets

COMMUNICATION SYSTEM

FIELD OF THE INVENTION

The present invention relates to a communication system and in particular but not exclusively to a communication system for use in a push-to-talk over cellular network.

BACKGROUND OF THE INVENTION

A communication system can be seen as a facility that enables communication sessions between two or more entities such as user equipment and/or other nodes associated with the communication system. The communication may comprise, for example, communication of voice, data, multimedia and the like. A session may, for example, be a telephone call type session between users, a multi-way conference session, or a communication session between user equipment and an application server (AS) such as a service provider server.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of rules on which the communication can be based is defined to enable communication.

Communication systems providing wireless communication for user equipment are known. An example of a wireless system is the public land mobile network (PLMN). PLMNs are commonly based on cellular technology. In cellular systems, a base transceiver station (BTS) or similar access entity services mobile user equipment (UE) via a wireless interface between these entities. The communication on the wireless interface between the user equipment and elements of the communication network can be based on an appropriate communication protocol. The operation of the base station apparatus and other apparatus required for the communication can be controlled by one or several control entities. The various control entities may be interconnected.

One or more gateway nodes may be provided for connecting the cellular access network to other networks, for example to a public switched telephone network (PSTN) and/or other communication networks such as an IP (Internet Protocol) and/or other packet switched data networks. In such arrangements, the mobile communications network provides an access network enabling a user with wireless user equipment to access external networks, hosts, or services offered by specific service providers.

An example of the type of services that may be offered to a user such as a subscriber to a communication system is the so called multimedia service. Some of the communication systems enabled to offer multimedia services are known as internet protocol multimedia networks. IP multimedia functionalities can be provided by means of an IP multimedia core network subsystem (IMS). The IMS includes various network entities for the provision of multimedia services. IMS services are intended to offer, amongst other services, IP based packet data communication sessions between mobile user equipment.

In a packet data network, a packet data carrier may be established to carry traffic flows over the network. An example of such a packet data carrier is a packet data protocol (PDP) context.

Various types of services are provided by means of different application servers (AS) over IMS. Some of these services may be time critical. An example of a time critical service that may be provided over the IMS is the so-called direct voice communication service. One example of this type of service is the 'push-to-talk over cellular' (PoC) service also known as the PTT (push-to-talk service). The direct voice communication services are intended to use the capabilities of the IMS to enable IP connections for user equipment and other parties to the communication, such as other user equipment or entities associated with the network. The service allows users to engage in immediate communication with one or more users.

The principle behind push-to-talk over cellular (PoC) communication systems is one where the capabilities of a walkie-talkie system are implemented within a standard cellular phone. Users simply select the person or groups of persons they wish to talk to from their phone and press the push to talk key on their mobile phone to start talking. The activation may be via a specific button, tangent or any other appropriate key of the keyboard. Similar principals apply with devices having touch sensitive or sound activated user interfaces. While the user speaks, the other user or users may listen. Bi-directional communication may be offered since all parties of the communication session may similarly communicate voice data with the PoC application server. Turns to speak are requested by activating the push to talk button or the like. The response time of connection is almost instantaneous.

Push-to-talk calls are typically half-duplex communications, i.e. while one user speaks the others listen. The turn to speak is granted by pressing the push-to-talk key on a first come first served basis or based on priorities. Push-to-talk calls are usually connected without the recipient answering and typically received through the phone's built in loud speaker.

As this system is integrated within the cellular telecommunication system this provides a coverage area greater than that provided using traditional two-way radio systems. The push-to-talk service may be implemented using push-to-talk servers in a IP multimedia subsystem (IMS) system. The push to talk service is based on multi-unicasting. Each transmitting handset sends packet data traffic to a dedicated push-to-talk server (a participating server). A controlling server receives the traffic and manages the shared floor for a group call. The controlling server duplicates the traffic to be received by all recipients. No multi-casting is performed either in the GPRS access network or over the radio access network.

The push to talk over cellular telecommunication system such as described within the push to talk over cellular draft provisions such as the 'OMA Push to talk over Cellular (PoC)-Architecture'.

Groups of communicating user equipment using the PoC system can be created in various ways. The Internet Engineering Task Force (IETF) defines one such system using session initiation protocol (SIP) or Conference Policy Control Protocol (CPCP). Voice and data control traffic once the groups are set up is carried through a real time protocol (RTP) streaming bearer. The PoC system uses transport protocols based on those described in IETF RFC 3550. The RTP protocol describes the architecture of the data packets and the syntax of the data stored within the packets passing the voice and data information from user to user.

The issue of privacy and anonymity over a PoC network has not been addressed. A user of a PoC network may wish to send a message and withhold their identity from the final destination whilst still being able to communicate an identity to one or more intermediaries.

Although there exists some SIP protocols for example ITEF RFC 3323 and ITEF RFC 3325 which enable users to withhold their identity whilst setting up an IMS connection there has been no discussion of how the data in a PoC network maintains the user's anonymity.

Furthermore there is no method available to enable a user, having joined a group, to request to talk within a group while also requesting that their identity is hidden from the other members of the group. This needs to be carried out while still transmitting their identity to the participating and controlling servers of the push-to-talk over cellular (PoC) system. The passing of identities allows the group to be monitored by authorised parties in order to discourage illegal activities from taking place while the users' identity is hidden.

It is the aim of embodiment of the present invention to address or at least mitigate the problems described above.

SUMMARY OF THE INVENTION

There is provided according to the present invention a communication system comprising: a first and second user equipment in communication over a shared floor; and a server means for managing the shared floor; wherein the server means is arranged to detect an anonymity request from the first user equipment, and responsive to said anonymity request to prevent the second user equipment from identifying the first user equipment from user plane messages transmitted from the first user equipment to the second user equipment.

The first user equipment may be arranged to initiate a connection with of the second user equipment via said server means using a first protocol.

The first protocol may be a session initiation protocol (SIP).

The first user equipment is preferably arranged to communicate over an existing connection with said second user equipment via said server means using a second protocol.

The second protocol may be a real time control protocol (RTCP).

The user plane messages are preferably transmitted using said second protocol.

The communications system may comprise a push-to-talk over cellular communications system.

The user plane message is preferably a floor control message.

The user plane message is preferably a floor taken message.

The user plane message is preferably a media message.

The server means may be arranged to remove identification of the first user from said user plane message.

The server means may be further arranged to insert into said user plane message a unique anonymous token.

The unique anonymous token is preferably stored within said the user plane message as at least part of a source description item.

The server means is preferably arranged to remove identification of the first user from said user plane message prior to transmitting to the second user equipment.

The user plane messages from the first user equipment may include identification information comprising at least one of a URI of the user equipment and a display name of the user equipment.

The anonymity request is preferably contained within at least one of: a subtype of the message; a payload type of the message; an additional SDES field within the message; an additional customised field.

The user plane message is preferably a floor request or talk request message.

The server means may comprise a controlling server and a participating server, wherein the controlling server is arranged to receive the anonymity request from the first user, and the participating server is arranged to transmit the user plane message.

The controlling server is preferably arranged to transmit a second user plane message to said participating server, said second user plane message comprises the identity of the first user equipment and a privacy indication, wherein said participating server is arranged to receive said second user plane message and responsive to said privacy indication to prevent the second user equipment from identifying the first user equipment.

The second user plane message privacy indication is preferably provided by at least one of: a subtype of the message; a payload type of the message; an additional SDES field within the message; an additional customised field.

According to a second aspect of the present invention there is provided server means arranged to operate in a communications system, said communications system further comprising a first and second user equipment in communication over a shared floor, wherein said server means is arranged to manage the shared floor, and further arranged to detect an anonymity request from the first user equipment, and responsive to said anonymity request to prevent the second user equipment from identifying the first user equipment from user plane messages transmitted from the first user equipment to the second user equipment.

According to a third aspect of the present invention there is provided user equipment arranged to operate in a communications system over a shared floor, said communications system further comprising server means arranged to manage the shared floor, wherein at least one of the user equipment is arranged to receive from said server means a user plane message preventing the at least one of the user equipment from identifying at least one other user equipment.

According to a fourth aspect of the present invention there is provided a method of communication, within a communications system comprising a first and second user equipment in communication over a shared floor and server means arranged to manage the shared floor, said method comprising the steps of: receiving at said server means a request for anonymity from the first user equipment, preventing the second user equipment from identifying the first user equipment from user plane messages transmitted from the first user equipment to the second user equipment.

According to a fifth aspect of the present invention there is provided a communication system comprising: a first and second user equipment in communication over a shared floor; and a controlling server for managing the shared floor; at least one participating server for serving said second user equipment; wherein the controlling server is arranged to detect an anonymity request from the first user equipment, and to insert into user plane messages from the first user equipment a privacy indication and when the participating server is responsive to said privacy indication to prevent the second user equipment from identifying the first user equipment.

BRIEF DESCRIPTION OF THE DRAWINGS

For a better understanding of the present invention and how the same may be carried into effect, reference will now be made by way of example only to the accompanying drawings in which.

DETAILED DESCRIPTION OF EMBODIMENTS OF THE PRESENT INVENTION

Certain embodiments of the present invention will be described by way of example, with reference to the exemplifying architecture of a third generation (3G mobile communication system). However it will be understood that embodiments may be applied to any other suitable forms of communication system.

The third generation partnership project (3GPP) has defined a reference architecture for the third generation (3G) core network which will provide the users of user equipment with access to multimedia services. This core network is divided into three principal domains. These are the circuit switched (CS) domain, the packet switched (PS) domain and the internet protocol multimedia subsystem (IMS) domain.

Figure 1:
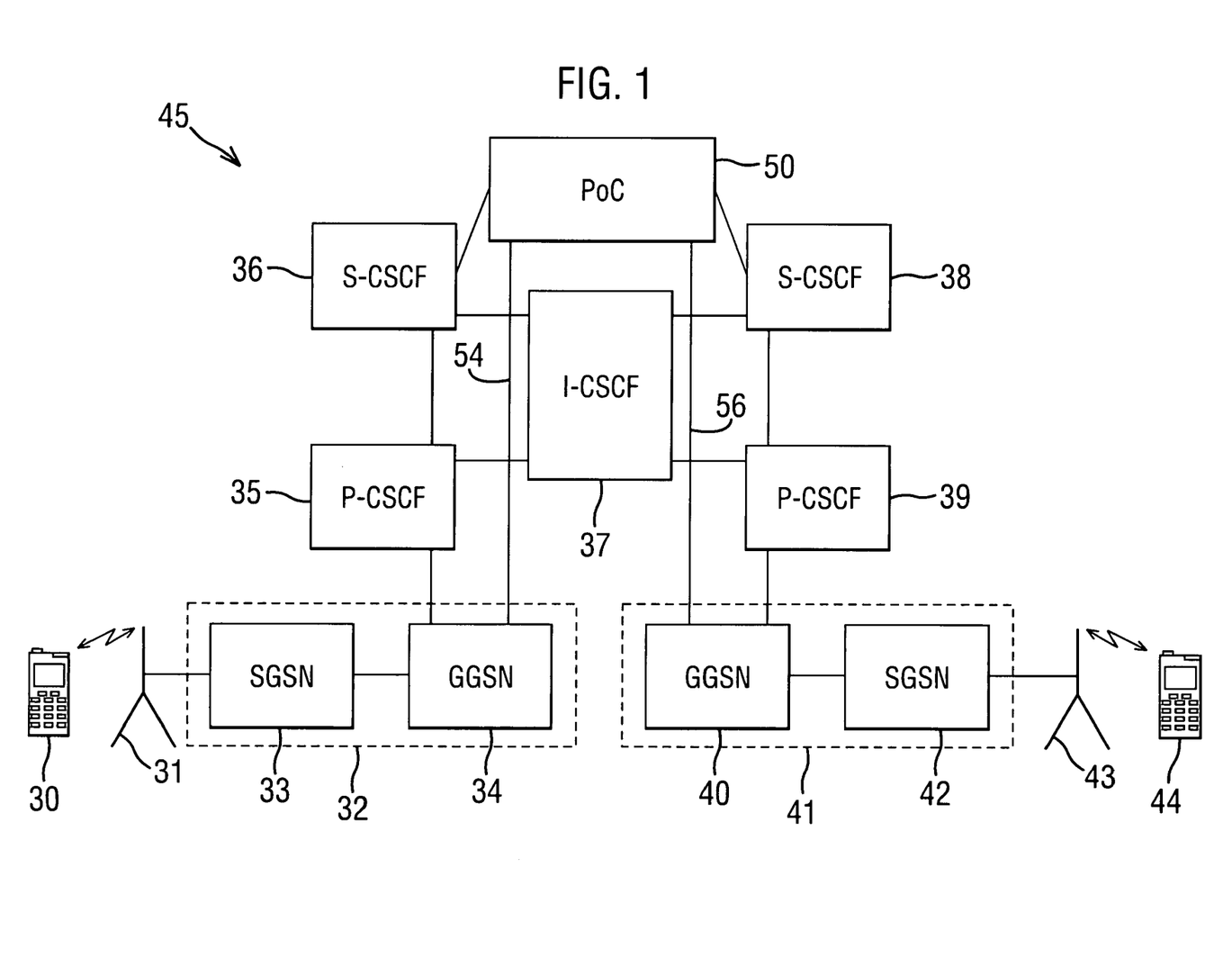
FIG. 1 shows a schematic view of a typical communications network incorporating an embodiment of the present invention.

FIG. 1 shows an IP multimedia network 45 for offering IP multimedia services to IP multimedia network subscribers. IP multimedia subsystem (IMS) functionalities may be provided by a core network (CN) subsystem including various entities for the provision of the service. The third generation partnership project (3GPP) has defined the use of the general packet radio service (GPRS) for offering IP connectivity to IMS services. Accordingly, a GPRS based system will be used in the following example of a possible backbone communication network enabling the IMS services.

A mobile communication system such as the 3G cellular system is typically arranged to serve a plurality of mobile user equipment, usually via a wireless interface between the user equipment and base stations of the communication system. The mobile communication system may logically be divided between a radio access network (RAN) and a core network (CN). The core network entities typically include various control entities and gateways for enabling the communication via a number of radio access networks and also for interfacing a single communication system with one or more communication systems such as with other cellular systems and/or fixed line communications systems.

In FIG. 1, the intermediate mobile communication network provides packet switched data transmission in the packet switched domain between a support node 33,42 and mobile user equipment 30,44. Different sub networks are in turn connected to an external data network, for example to a packet switched data network (PSDN) via gateway GPRS support nodes (GGSN) 34, 40. The GPRS services thus allow transmission of packet data between mobile data terminals and/or external data networks. More particularly, the exemplifying general packet radio services operation environment comprise one or more sub network service areas, which are interconnected by GPRS back bone networks 32 and 41. A sub network comprises a number of packet data service nodes (SN). In this embodiment, the service nodes will be referred to as serving GPRS support nodes (SGSN). Each of the SGSNs 33, 42 is connected to at least one mobile communication network, typically to base station systems 31,43. Although not shown for clarity reasons, the connection may be provided by way of radio network controllers or other access system controllers such as base station controllers in such a way that packet services can be provided for mobile user equipment via several base stations.

Base stations 31 and 43 are arranged to transmit signals to and receive signals from mobile user equipment 30 and 44 of mobile users i.e. subscribers, via respective wireless interfaces. Correspondingly, each of the mobile user equipment is able to transmit signals to and receive signals from the base stations via the wireless interface. In the simplified representation of FIG. 1, the base stations 31 and 43 belong to respective radio access networks (RAN). In the arrangement shown, each of the user equipment 30 and 44 may access the IMS network 45 via the two access networks associated with the base stations 31 and 43 respectively. It should be appreciated that, although FIG. 1 only shows the base stations of two radio access networks, a typical mobile communication network usually includes a number of radio access networks.

The IMS domain is for ensuring that multimedia services are adequately managed. The IMS domain commonly supports the session initiation protocol (SIP) as developed by the internet engineering task force (IETF). Session initiation protocol (SIP) is an application-layer control protocol for creating, modifying and terminating sessions with one or more participants (end point). SIP was generally developed to allow for the initiation of a session between two or more end points in the Internet by making these end points aware of the session semantics. A user connected to an SIP base communication system may communicate with various entities of the communication system based on standardised SIP messages. User equipment or users that run certain applications on the user equipment are registered with the SIP backbone so that an invitation to a particular session can be correctly delivered to these end points. SIP provides a registration mechanism for devices and users and it applies mechanisms such as location servers and registrars to route the session invitations appropriately. Examples of proper possible sessions that may be provided by SIP signalling include internet multimedia conferences, internet telephone calls and multimedia distribution.

User equipment within the radio access network may communicate with a radio network controller via radio network channels which are typically referred to as radio bearers. Each user equipment may have one or more radio channels open at any one time with the radio network controller. Any appropriate mobile user equipment adapted for internet protocol (IP) communication maybe used to connect to the network. For example, a user may access the cellular network by means of user equipment such as a personal computer, personal data assistant (PDA), mobile station (MS), portable computer, combinations thereof or the like.

User equipment is used for tasks such as making and receiving phone calls, for receiving and sending data from and to a network and for experiencing for example multimedia content. User equipment is typically provided with a processor and memory for accomplishing these tasks. User equipment may include an antenna for wirelessly receiving and transmitting signals from and to base stations of the mobile communication network. User equipment may also be provided with a display for displaying images and other graphical information for the user of the mobile user equipment. A speaker may also be provided. The operation of the user equipment may be controlled by means of a suitable user interface such as key pad, voice commands, touch sensitive screen or pad, combinations thereof or the like.

The user equipment 30 and 44 of FIG. 1 are configured to enable the use of push to talk types of services. An activation function that may be required by a push to talk service can be provided by one of the buttons on the keypad of the mobile station 30 and 44 or by a specific key or button such as the type known from—'walkie-talkie' devices.

It should be appreciated that FIG. 1 only shows two user equipment for clarity. In practice, a number of user equipment may be in simultaneous communication with each base station. User equipment may have several simultaneous sessions, for example a number of SIP sessions and activated PDP contexts. For example, the user may have a phone call and be simultaneously connected to at least one other service.

Overall communication between user equipment in an access entity and the GGSN is provided by a PDP context. Each PDP context provides a communication pathway between a particular user and a GGSN. Once the PDP context is established, it can typically carry multiple flows. Each flow normally represents, for example, a particular service and/or media component of a particular service. The PDP context therefore often represents a logical communication pathway for one or more flows across the network. To implement the PDP context between user equipment and the serving GPRS support node, radio access bearers need to be established which commonly allow for data transfer for the user equipment.

Communication systems have developed such that services may be provided for user equipment by means of various functions of the IMS network 45 that are handled by network entities and served by the servers. In the current 3G wireless multimedia network architectures, it is assumed that several different servers are for handling different functions. These include functions such as the call session control functions (CSCF). The call session control functions can be divided into various categories such as a proxy call session control function (P-CSCF) 35, 39, interrogating call session control function (I-CSCF) 37 and serving call session control function (S-CSCF) 36, 38.

The user equipment 30, 44 may connect via the GPRS network to application servers that are generally connected to the IMS. In FIG. 1, such an application server is provided by a push-to-talk-over cellular (PoC) services server 50. The PoC server can in some embodiments of the present invention be implemented as server means comprising a series of participating PoC servers connected to a controlling PoC server. The participating PoC servers transmit and receive data traffic from the user equipment and also transmit and receive data traffic from the controlling PoC server. The controlling PoC server transmits and receives data traffic from the participating PoC servers and controls access to the PoC shared floor dependent on the information received from the participating servers. In a further embodiment of the present invention one participating PoC server also acts as a controlling PoC server.

Figure 2:
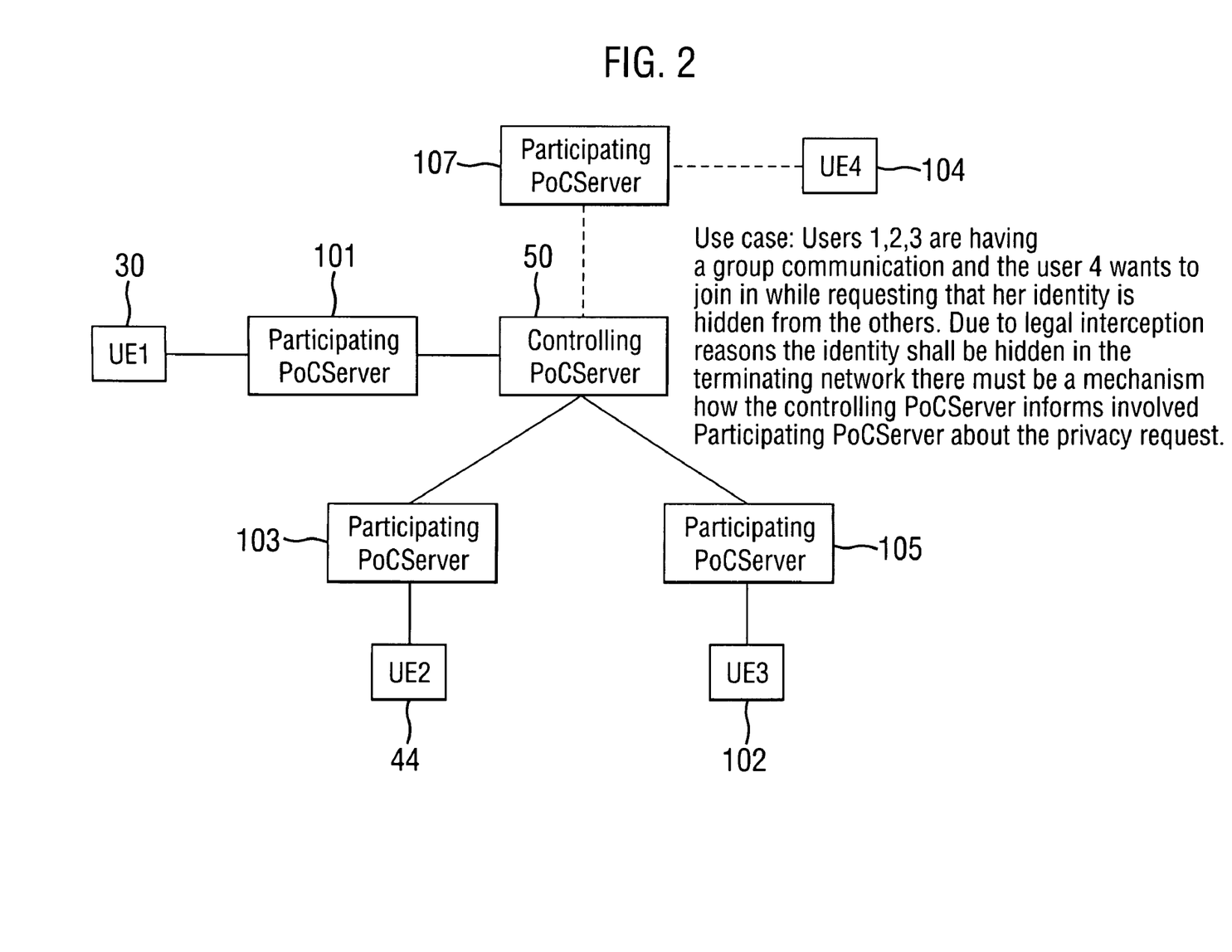
FIG. 2 shows a schematic view of the push-to-talk communications network as implemented within the communications network of FIG. 1.

FIG. 2 shows a further view of the communications system of FIG. 1 with regards to the push-to-talk over cellular (PoC) system. FIG. 2 shows a network of user equipment units UE1 30, UE2 44, UE3 102, UE4 104 communicating over a push-to-talk over cellular telecommunication system. UE1 30 is connected to the first participating PoC server 101, which is connected to the controlling PoC server 50. UE2 44 is connected to the second participating PoC server 103 which is connected to the controlling PoC server 50. UE3 102 is connected to the third participating PoC server 105 which is connected to the controlling PoC server 50. UE4 104 is connected to the fourth participating PoC server 107 which is connected to the controlling PoC server 50. In such a system the mobile user equipment UE1, UE2, UE3, and UE4 can be from four different IMS networks.

The PoC participating servers 101, 103, 105, 107 and controlling PoC server 50 provide push-to-talk over cellular (PoC) services over the IMS network 45. The push-to-talk service is an example of the so called direct voice communication service. Users who wish to use the PoC service may need to subscribe to an appropriate PoC server.

The direct voice communication services are intended to use the capabilities of the GPRS back bone and the control functions of the multimedia subsystem for enabling IP connections with the user equipment UE1 30, UE2 44, UE3 102, UE4 104. The PoC server may be operated by the operator of the IMS system or a third party service provider.

A user may open the communication link, for example, by pressing a specific activation button on the user equipment UE1 30. While the user of the UE1 30 speaks, the users of UE2 44, UE3 102, and UE4 104 listen. The user of the user equipment UE2 44 may then reply in a similar manner. The signalling between the user equipment and the appropriate call session control functions is routed via the GPRS network. The user plane session sets up signalling for the user equipment and is routed via the participating PoC servers 101, 103, 105, 107 and controlled by the controlling PoC server 50. In other words, the PoC server controls both the control plane (for signalling) and the User plane (for user data) of the PoC user. The control plane traffic between the participating PoC server and the user equipment may be routed via the IMS whilst the user plane traffic between the user equipment and the PoC server may be routed from the GPRS system to the PoC server on interfaces 54 and 56 (as shown in FIG. 1).

As discussed earlier the push-to-talk service is based on multi-unicasting. Each transmitting user equipment UE1 30, UE2 44, UE3 102, UE4 104 sends packet data traffic to a dedicated push-to-talk server and in case of a group call, the server then duplicates the traffic to all recipients. In order to control the communications system 'user plane' messages can be passed from one user to the rest of the system and vice versa. One type of data communications packet in the user plane is that of informing which user is transmitting or has received permission to use the floor. This information could be a 'floor taken' message. This 'floor taken' information is received by the user equipment which will receive RTP traffic from the user who has taken control of the floor. These control packets are based on a real time control protocol (RTCP) packet, a subset of the real time protocols (RTP) described earlier.

In order to aid the understanding of the present invention we shall describe a situation where the users UE1 30, UE2 44, UE3 102, and UE4 104 are involved in a group communication, and the user using user equipment UE4 104 wishes to talk whilst requesting that his/her identity is hidden from the others.

Figure 3:
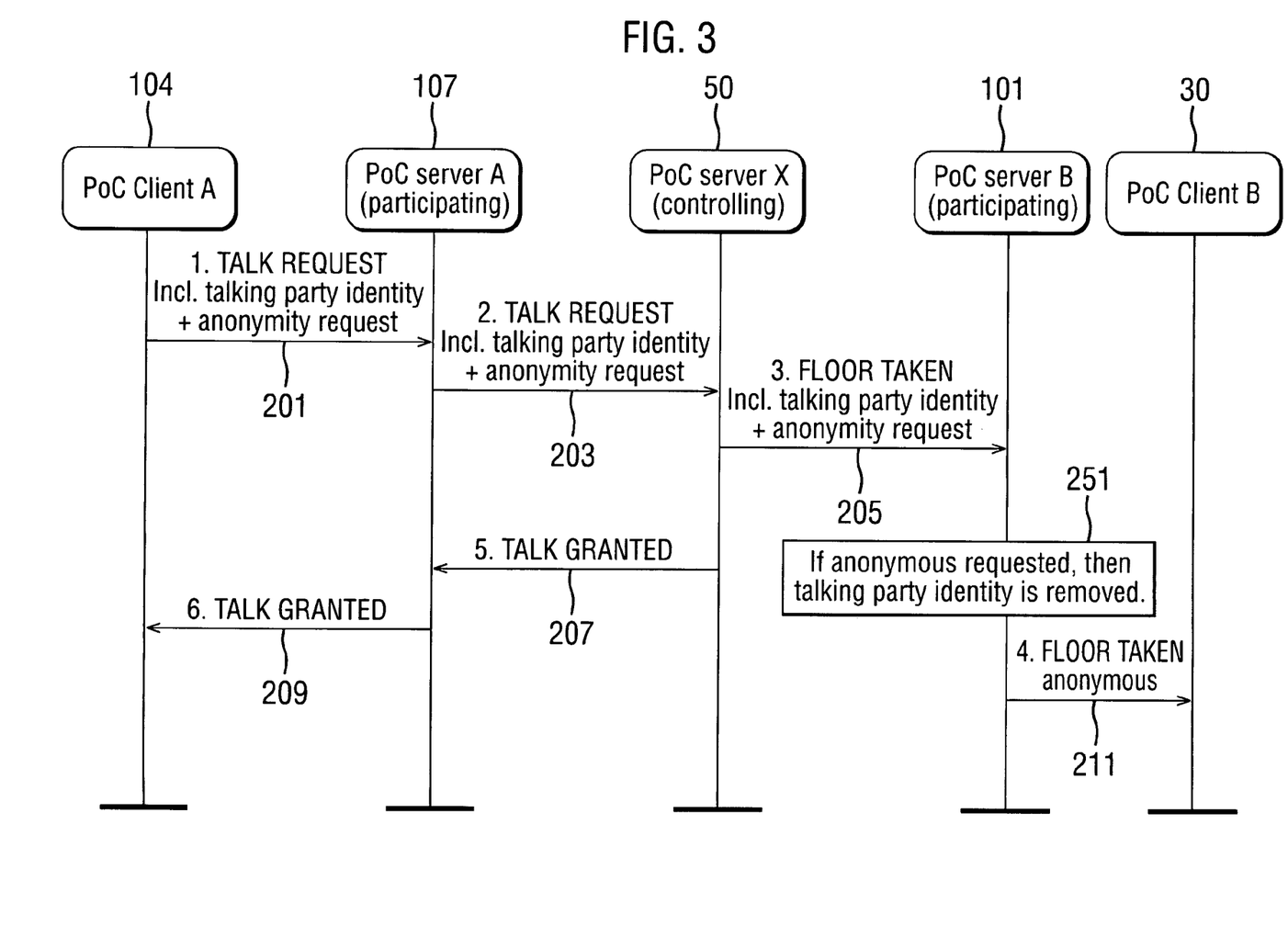
FIG. 3 shows a flow diagram showing a floor control procedure incorporating a first embodiment of the present invention.

With regards to FIG. 3 a flow diagram is shown describing an embodiment of the present invention in action. For clarity the PoC Client A refers in this example to the user equipment UE4 104, the participating PoC server A refers to the participating PoC server 107, the controlling PoC server X refers to the controlling PoC server 50, the PoC server B refers to the first participating PoC servers 101, and the PoC Client B refers to the respective user equipment UE1 30. Although a one-to-one communication is described within this example it is appreciated that the same method can be applied to a, one-to-many communication where the controlling PoC server copies the message to each of the receiving parties.

In the first step 201 the PoC Client A 104 transmits a 'talk request' message to the participating PoC server A 107. This 'talk request' message includes the talking party or user identity of the client A and an anonymity request.

The second step 203 occurs after the participating PoC server A 107 has received the talk request. In this step the participating PoC server A 107 forwards the 'talk request' including the talking party identity and the anonymity request to the controlling PoC server X 50.

The controlling PoC server X 50 may carry out authorisation of the client to determine that the client is authorised to participate in the PoC communications group. If the PoC Client A 104 is permitted to talk i.e. there is no other user occupying the floor then the controlling PoC server X 50 initiates a first step 205 and a second step 207.

The controlling PoC servers initiated first step 205 is where the controlling PoC server X 50 forwards a 'floor taken' message to the participating PoC server B 101. The 'floor taken' message includes the talking party identity together with the anonymity request from client A 104.

The controlling PoC servers initiated second step 207 is where the controlling PoC server X 50 transmits a 'talk granted' message to the participating PoC server A 107. In other embodiments of the present invention the controlling PoC server X 50 transmits a 'floor granted' message which is processed by the system in a manner similar to a 'talk granted' message. In the following step 209 the participating PoC server A transmits the 'talk granted' message received from the previous step towards the PoC Client A 104. This 'talk granted' message allows the client A to send a talk burst within the group, i.e. to broadcast to the group any message it wishes to send.

The participating PoC server B 101 receives the 'floor taken' message from the controlling PoC server X 50 including the talking party identity and anonymity request information. The participating PoC server B 101 recognises the anonymity request and removes the identity of the talking party from the 'floor taken' message. The participating PoC server B 101 generates a new 'floor taken' message within this step 251. The participating PoC server B 101 then transmits this new 'floor taken' message containing no identifying features of the user to the PoC Client B 30 in step 211.

Figure 4:
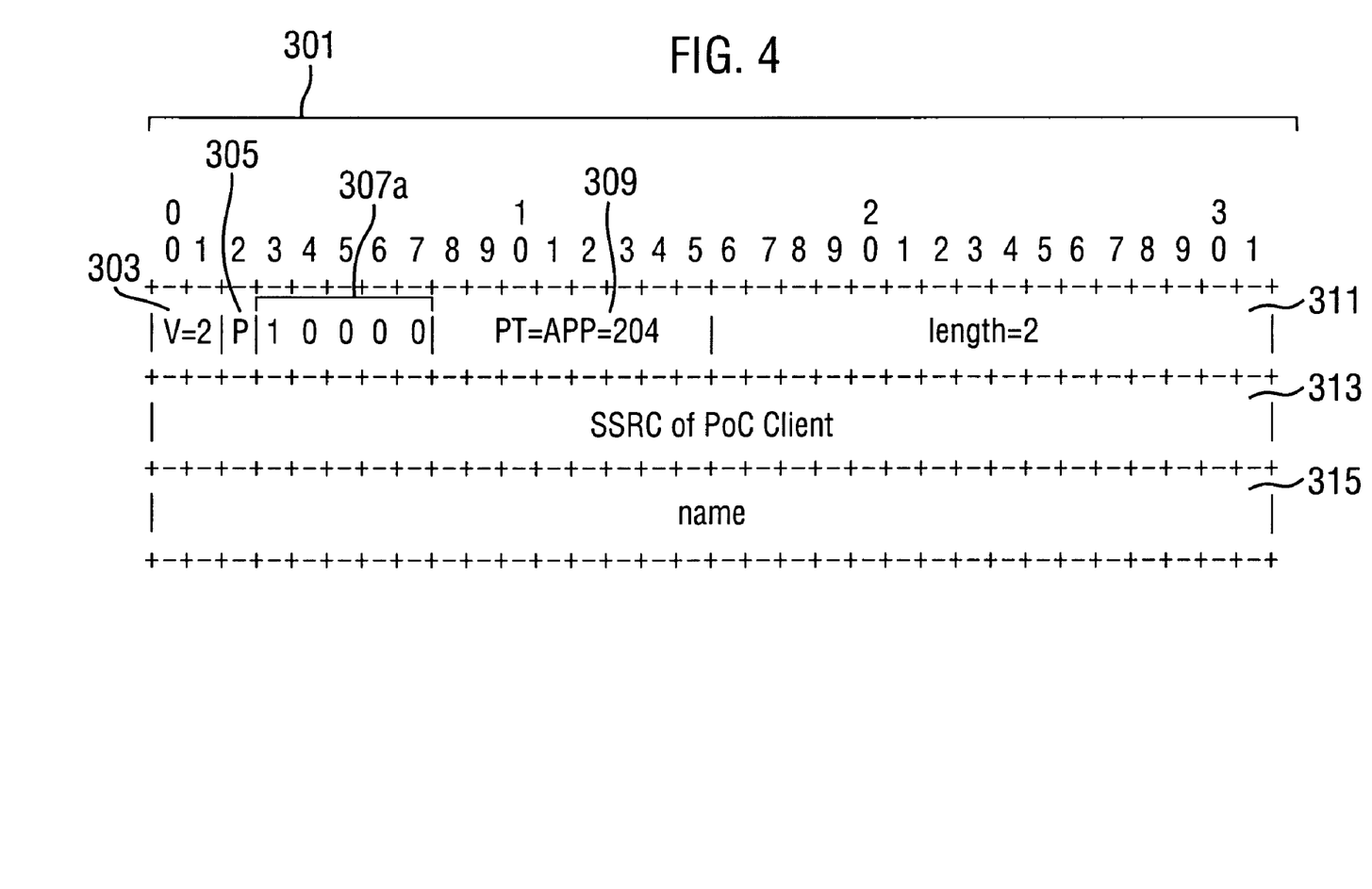
FIG. 4 shows a schematic view of RTCP 'talk request' data packet incorporating a first embodiment of the present invention.
Figure 5:
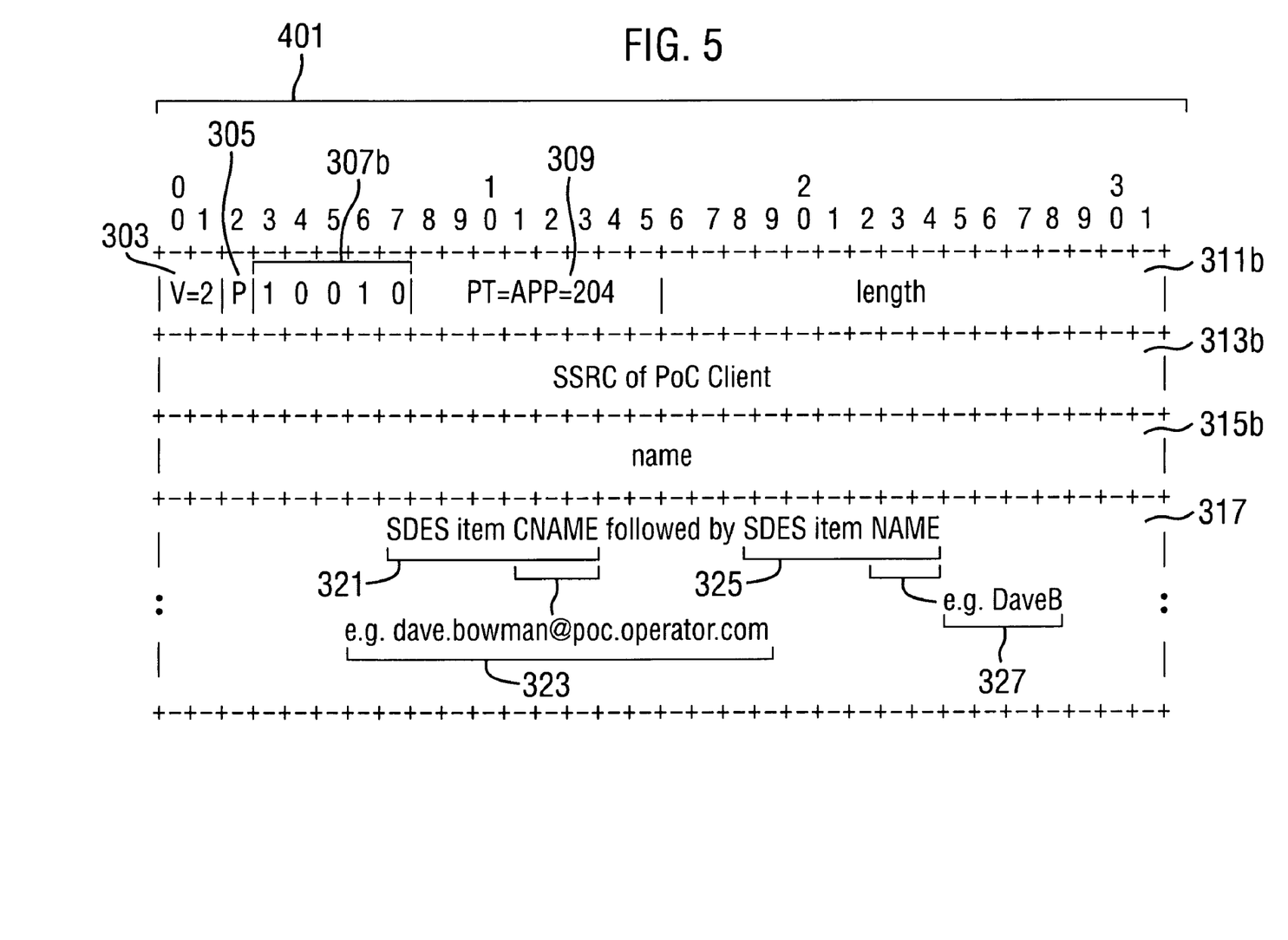
FIG. 5 shows a schematic view of a RTCP 'floor taken' data packet incorporating the first embodiment of the present invention.

With regards to FIGS. 4 and 5 examples of the 'talk request' message including the talking party identity and anonymity request and the 'floor taken' messages are shown.

With respect to FIG. 4 a real time control protocol (RTCP) based packet such as that used passing a 'talk request' data packet incorporating a first embodiment of the present invention is shown.

The 'talk request' RTCP packet is transmitted from the PoC Client A 104 to the participating PoC server 107, and forwarded by the participating PoC server A 107 to the controlling PoC server X 50 in order to request from the controlling server permission to transmit speech to the other users.

The 'talk request' RTCP packet comprises a datagram 32 bits in width. The first line of the datagram comprises a series of information values, a version indicator (V) 303 (2 bits), a padding bit (P) (1 bit) 305, a source count 307A (5 bits), a payload type (PT) (8 bits) 309, and a length indicator (LENGTH) 311.

As defined in IETF RFC3550 section 6.5 the version indicator 303 indicates the version of the RTP being used, in this example version 2. The padding bit 305 indicates if the packet contained one or more padding octets. The source count is used to identify a subtype that defines which of the various RTCP packets the present one is. In the example shown in FIG. 4 the value of 10000 indicates this is a modified 'talk request' RTCP packet, the modification being that the user requesting the talk request wishes to maintain anonymity to the other users of the group. The payload type (PT) 107 defines the format of the RTCP payload, in the example shown the payload type is equal to APP or 204. The length indicator (LENGTH) 311 describes the length of the packet in 32 bit words, not counting the first word. In this example the length is equal to two further 32 bit words.

The second line of the datagram comprises a synchronisation source identifier (SSRC) 313, which identifies the synchronisation source for the originator of the packet. In the example shown where the packet is a 'talk request' packet the SSRC 313 is that for the PoC Client A 104.

The third and final line of the RTCP packet comprises the displayed address 'name' 315 for the user equipment. The 'name' field can also be used to indicate the application release version.

This packet once received by the participating server A at the end of step 201 is then forwarded in step 203 to the controlling PoC server X 50.

With respect to FIG. 5 a real time control protocol (RTCP) based packet such as that used passing a 'floor taken' message data packet incorporating a first embodiment of the present invention is shown.

According to the method described earlier there are two types of 'floor taken' messages used. The first type of 'floor taken' RTCP packet transmitted from the controlling PoC Server 50 through the network to a participating PoC server, e.g. the first participating PoC server 103. The second type is transmitted from the participating PoC server to the user equipment, e.g. UE1 30, and prepares the user equipment to receive RTP packets from the user equipment which has been granted the floor. Both the first and second types can be described with respect to FIG. 5.

The 'floor taken' RTCP packet comprises a datagram 32 bits in width.

The first line of the datagram comprises a series of information values, a version indicator (V) 303 (2 bits), a padding bit (P) (1 bit) 305, a source count (5 bits) 307b, a payload type (PT) (8 bits) 309, and a length indicator (length) 311b.

As defined in IETF RFC 3550 section 6.5 the version indicator 303 indicates the version of the RTP being used, in this example version 2. The padding bit 305 indicates if the packet contains one or more padding octets. The source count 307b is used to identify a subtype that defines which of the various RTCP packets the present one is. In the example shown in FIG. 5 the value of 10010 indicates that this is a modified 'floor taken' RTCP packet where the user requested anonymity (as compared to the subtype 00010 indicating a regular 'floor taken' RTCP packet). The payload type (PT) 309 defines the format of the RTCP payload, in the example shown the payload type is equal to APP or 204. The length indicator (length) 109 describes the length of the packet in 32 bit words, not counting the first word.

The second line of the datagram comprises a synchronisation source identifier (SSRC) 313*b*, which identifies the synchronisation source for the originator of the packet. In the example shown where the packet is a modified 'floor taken' packet the SSRC 313*b* is that for the controlling PoC server 50.

The third line of the RTCP packet comprises the displayed address (name) 315*b* for the push-to-talk over cellular (PoC) server. The 'name' field can also be used to indicate the application release version.

The fourth and further lines of the packet comprises an information block 317.

For the first type of 'floor taken' message the information block comprises two source description (SDES) items.

The first source description item 321 comprises the canonical name (CNAME). The canonical name comprises the canonical name of the user 323. The canonical name of the user 323 is defined as the unique identifier assigned to the user/user equipment combination. An example of such a unique identifier would be the SIP uniform resource indicator (URI) such as that shown in FIG. 5, 'dave.bowman@poc.operator.com'.

The second source description item 325 comprises the display name (name). The display name comprises the display name of the user 327. The display name of the user 327 is an identifier displayed by the user equipment indicating the user/user equipment combination. An example of such an identifier would be the alphanumeric string such as that shown in FIG. 5 'DaveB'.

Once the participating PoC server B 103 has received the floor taken anonymously packet the participating PoC server B processes the 'floor taken' message to remove the canonical name (CNAME) and display name (NAME) of the user. The CNAME and NAME values may be in some embodiments of the present invention given unique anonymous names. In such a situation it would be possible for the user to maintain their anonymity, but authorities still be able to link the message to a particular user given the particular relationship between the unique anonymous name and the user name.

In further embodiments of the present invention the subtype of the 'floor taken' message reverts to the normal subtype for a 'floor taken' message. In such an embodiment it is therefore possible to prevent the receiving user equipment detecting that the transmitting user equipment has requested anonymity.

In such a situation described above the user is capable of maintaining anonymity when requested in front of other clients or user equipment, but still be capable of being monitored by authorised parties at the controller.

Although the above example has been described in terms of providing an anonymity request within the subtype field of a RTCP floor control packet it can be appreciated that in other embodiments of the present invention, the indicator can be located within other parts of the floor control message.

In one further embodiment, the request for anonymity is indicated by the use of a modified payload type. The controlling PoC server and participating PoC servers are able to recognise this modified payload type to provide the required anonymity.

In another further embodiment the request for anonymity may be indicated by the provision of additional SEDS fields incorporating an anonymous or alternative identity from the user.

In further embodiments of the present invention the request for anonymity within the floor control message can be indicated by adding additional customised fields to the packet.

In the example of adding an additional SDES field including the anonymous identity the first type 'floor taken' message sent from the controlling PoC server 50 to the participating PoC server B 103 carries the anonymous information together with the SDES field containing the anonymous ID of the user. The second type 'floor taken' message from the participating PoC server 103 to the receiving PoC client 30 includes only the anonymous information, i.e. the ID of the user is removed prior to forwarding to the PoC Client B 30.

In further embodiments of the present invention the anonymous or alternative identity is provided not as an additional SDES field but is concatenated to the original SDES field information in order to form a compound SDES field. For example the display name in the first type of 'floor taken' message can contain the data, "name+++anonymousID", where the 'name' is the display name of the user, the string '+++' a separator and 'anonymousID' the name passed to the other users in the second type of 'floor taken' message.

In further embodiments of the present invention the anonymity information or packet or element is piggybacked with the known 'floor taken' packet. In such an embodiment a first 'floor taken' RTCP packet comprising source description information comprising canonical user name and display user name is concatenated with a second packet containing anonymity information to form a compound RTCP packet.

In a further embodiment of the present invention a 'floor taken' RTCP packet as known in the art is followed directly by a second RTCP packet containing anonymity information. This second packet is a predefined real time control protocol (RTCP) application (APP) packet.

In a further embodiment the anonymity identifier source description item PRIV produces a PoC specific private extension transporting the anonymity information.

Figure 6:
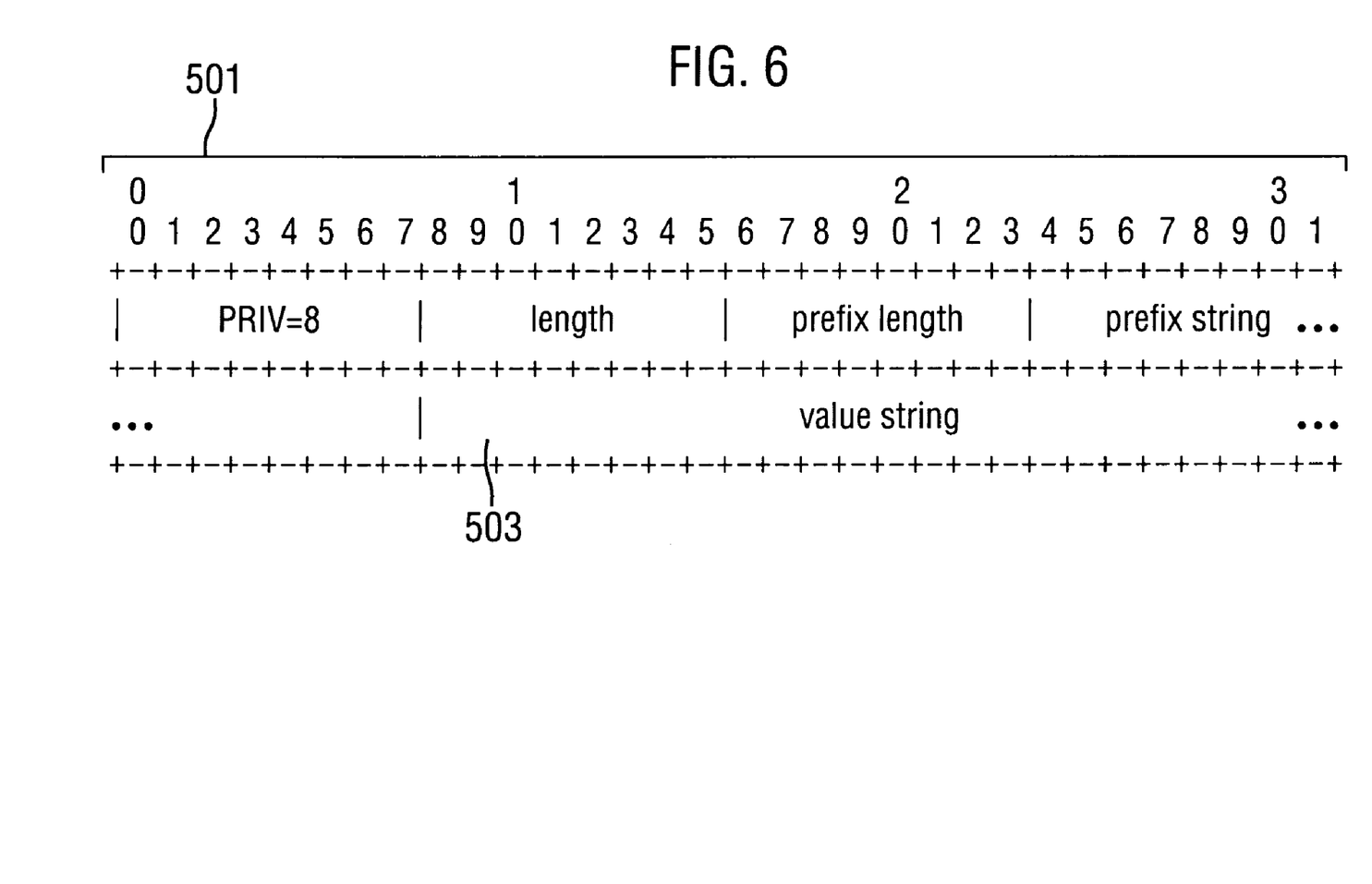
FIG. 6 shows a schematic view of a 'PRIV' source description data packet incorporating a further embodiment of the present invention.

With reference to FIG. 6 an example of a PRIV message packet including the anonymity information is shown. The PRIV packet 501 comprises a value string 503 which contains the anonymity information, i.e. the indicator and/or any anonymity ID.

In further embodiments of the present invention the canonical name of the user can be the Tel URL/URI of the user. The Tel URL/URI is the SIP equivalent to the telephone number of the user equipment as used in the public switched telephone network (PSTN).

In further embodiments of the present invention the controlling POC server remembers an instance during a user's initialisation where the user requested anonymity. This request can be carried out using the SIP protocols described within IETF RFC 3325 and/or IETF RFC 3323. In this embodiment the controlling PoC server examines any talk or floor request messages and applies the privacy as requested by the user, i.e. the controlling PoC server transmits a 'floor taken' message as if it had received a 'talk request' message containing an anonymity request.

Embodiments of the present invention may use other types of floor control messages or indeed other types of messages to provide the described information. Examples of other types of messages include media messages.

Embodiments of the present invention may further use protocols other then RTCP for transmitting user and control plane messages.

In further embodiments of the present invention, where the controlling server is transmitting to a user equipment serviced by a participating server within an untrusted network, the controlling PoC server carries out the tasks of stripping any identifying feature from the forwarded messages before forwarding the message onto the untrusted network participating server.

In other embodiments of the present invention the user equipment can transmit an anonymous value as the users display name. In these embodiments the system is arranged not to strip the anonymous value but to simply forward the value. Thus the user still maintains their privacy within such a system.

The invention claimed is:

1. An apparatus comprising a server configured to:
  detect an anonymity request for a first user equipment, wherein the first user equipment is in communication with a second user equipment over a shared floor; and
  responsive to said anonymity request, prevent the second user equipment from identifying the first user equipment from at least one user plane message transmitted from the first user equipment to the second user equipment by removing the identification of the first user equipment from the at least one user plane message, the at least one user plane message comprising a unique anonymous token, the unique anonymous token linking the at least one user plane message to the first user equipment to enable another equipment different from the first user equipment and the second user equipment to link the at least one message to the first user equipment based on the anonymous token, while preventing the second user equipment from identifying the first user equipment based on the anonymous token;
  wherein the server is in communication with a controlling server to control access to the shared floor, and further configured to receive from the controlling server the at least one user plane message including shared floor access control signals, the anonymity request for the first user and the identification of the first user equipment.

2. The apparatus as claimed in claim 1, wherein the first user equipment is configured to initiate a connection with the second user equipment via said server using a first protocol.

3. The apparatus as claimed in claim 2, wherein said first protocol comprises a session initiation protocol (SIP).

4. The apparatus as claimed in claim 1, wherein the first user equipment is configured to communicate over an existing connection with said second user equipment via said server using a second protocol.

5. The apparatus as claimed in claim 4, wherein said second protocol comprises a real time control protocol (RTCP).

6. The apparatus as claimed in claim 4, wherein said at least one user plane message is transmitted using said second protocol.

7. The apparatus as claimed in claim 1, wherein said apparatus is in a communications system comprising a push-to-talk over cellular communications system.

8. The apparatus as claimed in claim 7, wherein said at least one user plane message comprises a floor control message.

9. The apparatus as claimed in claim 8, wherein said at least one user plane message comprises a floor taken message.

10. The apparatus as claimed in claim 7, wherein said at least one user plane message comprises a media message.

11. The apparatus as claimed in claim 1, wherein said unique anonymous token is stored within said at least one user plane message as at least part of a source description item.

12. The apparatus as claimed in claim 1, wherein the server is further configured to remove the identification of the first user from said at least one user plane message prior to transmitting to the second user equipment.

13. The apparatus as claimed in claim 1, wherein said identification comprising at least one of a Uniform Resource Indicator (URI) of the first user equipment and a display name of the first user equipment.

14. The apparatus as claimed in claim 1, wherein the anonymity request is included within at least one of
  a subtype of the at least one user plane message,
  a payload type of the at least one user plane message,
  an additional source description (SDES) field within the at least one user plane message, and
  an additional customized field.

15. The apparatus as claimed in claim 1, wherein said at least one user plane message comprises a floor request or talk request message.

16. The apparatus as claimed in claim 1, wherein the server comprises:
  a participating server configured to receive the anonymity request for the first user equipment, and to transmit the at least one user plane message.

17. The apparatus of claim 1, wherein the user plane message comprises the anonymity request and the identification of the first user equipment, wherein the server is further configured to receive the anonymity request in the or each of the at least one user plane message.

18. The apparatus of claim 1, wherein the or each of the at least one user plane message transmitted from the first user equipment to the second user equipment comprises a first user plane message and a second user plane message, the server being further configured to:
  receive the first user plane message including the anonymity request and the identification of the first user equipment;
  generate the second user plane message from said first user plane message, including removing said identification of the first user equipment; and
  send the second user plane message to the second user equipment.

19. A method comprising:
  receiving a request for anonymity from a first user equipment, wherein the first user equipment and a second user equipment are in communication over a shared floor;
  preventing the second user equipment from identifying the first user equipment from at least one user plane message transmitted from the first user equipment to the second user equipment by removing, at a server serving the second user equipment, the identification of the first user equipment from the at least one user plane message, wherein the at least one user plane message comprises a unique anonymous token, the unique anonymous token linking the at least one user plane message to the first user equipment to enable another equipment different from the first user equipment and the second user equipment to link the at least one message to the first user equipment based on the anonymous token, while preventing the second user equipment from identifying the first user equipment based on the anonymous token;
  wherein the server serving the second user equipment is in communication with a controlling server to control access to the shared floor, and further configured to receive from the controlling server the at least one user plane message including shared floor access control signals, the anonymity request for the first user and the identification of the first user equipment.

20. A system, comprising:
  a first and second user equipment in communication over a shared floor;

a controlling server configured to manage the shared floor; and at least one participating server configured to serve said second user equipment, wherein the controlling server is configured to detect an anonymity request from the first user equipment, to insert into user plane messages from the first user equipment a privacy indication and, wherein the at least one participating server is further configured, responsive to said privacy indication, to prevent the second user equipment from identifying the first user equipment by removing an identification of the first user equipment from said user plane messages, wherein the user plane messages comprise a unique anonymous token, the unique anonymous token linking the user plane messages to the first user equipment to enable another equipment different from the first user equipment and the second user equipment to link the user plane messages to the first user equipment based on the anonymous token, while preventing the second user equipment from identifying the first user equipment based on the anonymous token;

wherein the at least one participating server is in communication with the controlling server, the controlling server further configured to forward to the at least one participating server the user plane messages, at least one of the user plane messages including shared floor access control signals, the privacy indication and the identification of the first user equipment.

21. An apparatus, comprising:

detecting means for detecting an anonymity request from a first user equipment, wherein the first user equipment is in communication with a second user equipment over a shared floor; and responsive to said anonymity request, preventing means for preventing the second user equipment from identifying the first user equipment from at least one user plane message transmitted from the first user equipment to the second user equipment by removing an identification of the first user equipment from said at least one user plane message, wherein the at least one user plane message comprises a unique anonymous token, the unique anonymous token linking the at least one user plane message to the first user equipment to enable another equipment different from the first user equipment and the second user equipment to link the at least one message to the first user equipment based on the anonymous token, while preventing the second user equipment from identifying the first user equipment based on the anonymous token;

wherein the detecting means is in communication with a controlling server to control access to the shared floor, and further configured to receive from the controlling server the at least one user plane message including shared floor access control signals, the anonymity request for the first user and the identification of the first user equipment.

22. A computing-based device comprising a server configured to perform:

receiving a request for anonymity from a first user equipment, wherein the first user equipment and a second user equipment are in communication over a shared floor; and preventing the second user equipment from identifying the first user equipment from at least one user plane message transmitted from the first user equipment to the second user equipment by removing the identification of the first user equipment from the at least one user plane message, wherein the at least one user plane message comprises an anonymous token, the unique anonymous token linking the at least one user plane message to the first user equipment to enable another equipment different from the first user equipment and the second user equipment to link the at least one message to the first user equipment based on the anonymous token, while preventing the second user equipment from identifying the first user equipment based on the anonymous token;

wherein the server serving the second user equipment is in communication with a controlling server to control access to the shared floor, and further configured to receive from the controlling server the at least one user plane message including shared floor access control signals, the request for anonymity from the first user equipment and the identification of the first user equipment.

23. An apparatus comprising a server configured to:

responsive to a privacy indication received in a user plane message, wherein a first user equipment and a second user equipment are in communication over a shared floor, the user plane message comprising an identity of the first user equipment and the privacy indication, prevent the second user equipment from identifying the first user equipment by removing the identity from the user plane message, wherein the user plane message comprises an anonymous token, the unique anonymous token linking the user plane message to the first user equipment to enable another equipment different from the first user equipment and the second user equipment to link the user plane message to the first user equipment based on the anonymous token, while preventing the second user equipment from identifying the first user equipment based on the anonymous token;

wherein the server is in communication with a controlling server to control access to the shared floor, and further configured to receive from the controlling server the user plane message including shared floor access control signals, the privacy indication and the identification of the first user equipment.

24. The apparatus as claimed in claim 23, wherein said user plane message privacy indication is provided by at least one of a subtype of the user plane message, a payload type of the user plane message, an additional source description (SDES) field within the user plane message, and an additional customized field.

25. A method comprising:

responsive to a privacy indication received in a user plane message, wherein a first user equipment and a second user equipment are in communication over a shared floor, the user plane message comprising an identity of the first user equipment and the privacy indication, preventing the second user equipment from identifying the first user equipment by removing the identity from the user plane message, wherein the user plane message comprises anonymous token, the unique anonymous token linking the user plane message to the first user equipment to enable another equipment different from the first user equipment and the second user equipment to link the user plane message to the first user equipment based on the anonymous token, while preventing the second user equipment from identifying the first user equipment based on the anonymous token;

wherein a server serving the second user equipment is in communication with a controlling server to control access to the shared floor, and further configured to receive from the controlling server the user plane message including shared floor access control signals, the privacy indication and the identification of the first user equipment.

26. An apparatus comprising a controlling server configured to:
   manage a shared floor, a first user equipment and a second user equipment being in communication over the shared floor;
   receive a first user plane message comprising an identification of the first user equipment and an anonymity request from the first user equipment;
   detect the anonymity request; and
   send a second user plane message to a participating server, said second user plane message comprising an identity of the first user equipment and a privacy indication;
   wherein the second user plane message further comprises a unique anonymous token, the unique anonymous token linking the user plane message to the first user equipment to enable another equipment different from the first user equipment and the second user equipment to link the user plane message to the first user equipment based on the anonymous token, while preventing the second user equipment from identifying the first user equipment based on the anonymous token;
   wherein the controlling server is further configured to generate shared floor access control signals and to send to the participating server the second user plane message that further includes the shared floor access control signals.

27. A method comprising:
   managing a shared floor, a first user equipment and a second user equipment being in communication over the shared floor;
   receiving, at a controlling server, a first user plane message comprising an identification of the first user equipment and the anonymity request from the first user equipment;
   detecting the anonymity request; and
   sending a second user plane message to a further server, said second user plane message comprising an identity of the first user equipment and a privacy indication;
   wherein the user plane message comprises a unique anonymous token, the unique anonymous token linking the user plane message to the first user equipment to enable another equipment different from the first user equipment and the second user equipment to link the user plane message to the first user equipment based on the anonymous token, while preventing the second user equipment from identifying the first user equipment based on the anonymous token;
   wherein the controlling server is configured to send to the further server the second user plane message that further includes the shared floor access control signals.

* * * * *